Feb. 1, 1938.  C. J. BRISTOW  2,106,885
STORE FRONT CONSTRUCTION
Filed Feb. 12, 1936
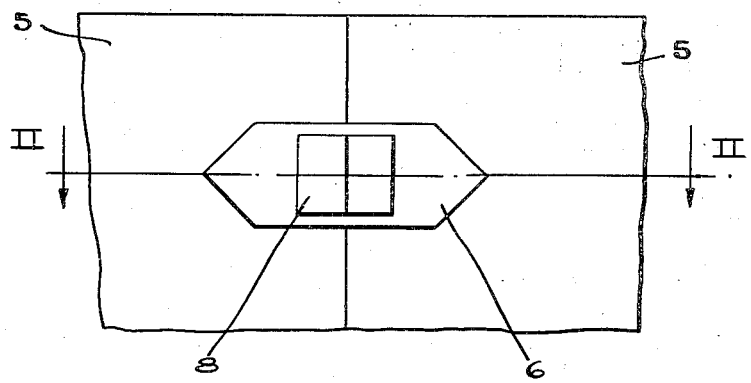
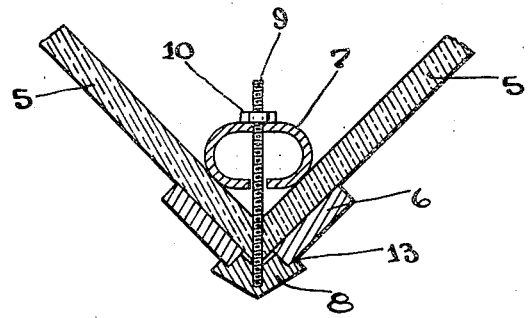
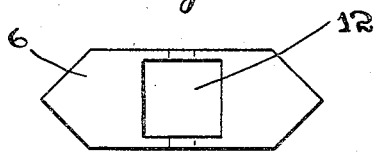
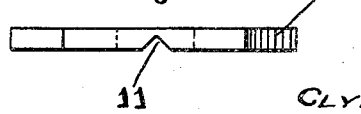
INVENTOR.
CLYDE J. BRISTOW
BY Bradley + Bee
ATTORNEYS.

Patented Feb. 1, 1938

2,106,885

UNITED STATES PATENT OFFICE 2,106,885

STORE FRONT CONSTRUCTION

Clyde J. Bristow, Oakmont, Pa., assignor to Pittsburgh Plate Glass Company, a corporation of Pennsylvania Application February 12, 1936, Serial No. 63,539

3 Claims. (Cl. 189—78)

The invention relates to store front construction and particularly to the corner and division bars. The invention has for its principal objects the provision of an improved device which is of simple and secure construction and permits of the use of the one device with glass plates which lie at all angles between 90 and 180 degrees. One embodiment of the invention is illustrated in the accompanying drawing, wherein:

Figure 1 is a front elevation. Fig. 2 is a section on the line II—II of Fig. 1. And Figs. 3 and 4 are detail views of the clamping plate, Fig. 3 being a plan view and Fig. 4 an edge view.

Referring to the drawing, 5, 5 are glass plates; 6 is the clamping plate which lies on the outer side of the glass plates; 7 is the back clamp which lies on the inner sides of the glass plates; 8 is the cap which interfits with the clamping plate 6; 9 is the stem for securing the parts in assembled relation; and 10 is a nut which is threaded onto the stem.

The clamping plate 6 is preferably made of a tough aluminum alloy and is supplied for use in the shape indicated in Figs. 3 and 4 and is provided with the notch, so that it can bend to fit against the outer faces of the glass plates regardless of the angle at which they may be placed. The plate has no temper and may be readily bent by the fingers of the operator to the desired shape. At the center of the plate is a rectangular opening 12 ordinarily about ⅝″ in width and length, into which the cap 8 fits, as indicated in Fig. 2. This cap is also preferably made of an aluminum alloy and is relatively thick and rigid. It is provided with a pair of flanges 13, 13 which overlie the outer surfaces of the plate 6. The stem 9, which is preferably of brass and threaded throughout its length is screwed into the cap and passes through the back clamp 7, as shown in the drawing. The back clamp may be of any suitable shape and is preferably made of brass. When the nut 10 is screwed down tightly, the parts are securely held in assembled relation.

Due to the fact that the plate 6 is weakened by the notch or slot 11, it requires a substantial degree of support, and this support is afforded by the flanges 13, 13 of the cap 8, which overlap the plate 6 at the edges of the opening 12 and give the construction the necessary degree of rigidity when the parts are clamped together. The construction may be used with sheets lying at angles ranging from 180 degrees to the 90 degree position shown in Fig. 2. The clamp is simple and secure and presents a good appearance from the outer side of the window or showcase. It also has the further advantage that only one form of plate and cap is required, such plate and cap being adaptable to all varying angles at which the glass plates are used. The outer face of the cap as shown is of peak or ridge form, but it will be understood that this outer surface may be modified to meet requirements as to appearance.

What I claim is:

1. In combination in a store front construction, a pair of glass sheets having their edges in opposition, a clamping plate extending across said edges on the outer sides of the sheets formed so that it may be bent at its center to fit against the faces of the sheets and having an opening through its central portion, a cap fitting into said opening and provided with flanges which overlie the outer face of the plate on each side of the center line thereof, a stem secured at one end in the cap extending inwardly between the edges of the glass sheets, and a back clamp releasably secured upon the inwardly extending portion of the stem and engaging the rear faces of the glass sheets in opposition to the clamping plate.

2. In combination in a store front construction, a pair of glass sheets having their edges in opposition, a clamping plate extending across said edges on the outer sides of the sheets formed so that it may be bent at its center to fit against the faces of the sheets and having a rectangular opening through its central portion, a cap fitting into said opening and provided with flanges which overlie the outer face of the plate on each side of the center line thereof, a threaded stem secured at one end in the cap extending inward between the edges of the glass sheets, a back clamp engaging the rear faces of the glass sheets in opposition to said clamping plate through which said stem extends, and a securing nut on said stem holding the clamping plate and the back clamp in assembled relation.

3. In combination in a store front construction, a pair of glass sheets disposed in angular relationship to each other and having their edges in opposition, a clamping plate extending across said edges on the outer sides of the sheets notched at its center on its inner side so that it may be bent to suit the angle at which the glass sheets lie and having a rectangular opening through its central portion, a cap fitting into said opening and provided with flanges which overlie the outer face of the plate on each side of the center line thereof, a stem secured at one end in the cap extending inwardly between the edges of the glass sheets, and a back clamp engaging the rear faces of the glass sheets in opposition to the clamping plate, said back clamp being releasably secured to the inwardly extending portion of the stem.

CLYDE J. BRISTOW.